(12) United States Patent
Ongerth et al.

(10) Patent No.: US 11,333,252 B2
(45) Date of Patent: May 17, 2022

(54) SLIP RING SEALING ARRANGEMENT AND SLIP RING SEALING KIT

(71) Applicant: EagleBurgmann Germany GmbH & Co. KG, Wolfratshausen (DE)

(72) Inventors: Doris Ongerth, Geretsried (DE); Wolfgang Ries, Bad Kohlgrub (DE)

(73) Assignee: EagleBurgmann Germany GmbH & Co. KG, Wolfratshausen (DE)

(*) Notice: Subject to any disclaimer, the term of this patent is extended or adjusted under 35 U.S.C. 154(b) by 149 days.

(21) Appl. No.: 16/636,718

(22) PCT Filed: Aug. 9, 2018

(86) PCT No.: PCT/EP2018/071609
§ 371 (c)(1),
(2) Date: Feb. 5, 2020

(87) PCT Pub. No.: WO2019/034519
PCT Pub. Date: Feb. 21, 2019

(65) Prior Publication Data
US 2020/0240522 A1  Jul. 30, 2020

(30) Foreign Application Priority Data
Aug. 14, 2017  (DE) .................. 10 2017 214 132.8

(51) Int. Cl.
*F16J 15/34*  (2006.01)
*F16J 15/3268*  (2016.01)
*F16J 15/3284*  (2016.01)

(52) U.S. Cl.
CPC ....... *F16J 15/3464* (2013.01); *F16J 15/3268* (2013.01); *F16J 15/3284* (2013.01); *F16J 15/3496* (2013.01)

(58) Field of Classification Search
CPC .......... F16J 15/16; F16J 15/34; F16J 15/3464; F16J 15/3472; F16J 15/348; F16J 15/3496; F16J 15/3268; F16J 15/3284
See application file for complete search history.

(56) References Cited

U.S. PATENT DOCUMENTS 3,972,536 A * 8/1976 Warner ................ F16J 15/3464
                                              277/379
5,435,574 A * 7/1995 Victor .................. F16J 15/3412
                                              277/379
(Continued)

FOREIGN PATENT DOCUMENTS

CN      105074299 A    11/2015
WO    2017/119882 A1    7/2017

OTHER PUBLICATIONS

International Search Report issued in PCT/EP2018/071609, dated Oct. 10, 2018.

*Primary Examiner* — Gilbert Y Lee
(74) *Attorney, Agent, or Firm* — Locke Lord LLP; Scott D. Wofsy

(57) ABSTRACT

The invention relates to a mechanical seal assembly, comprising: a mechanical seal (10) including a rotating mechanical sliding ring (2) and a stationary mechanical sliding ring (3), defining a sealing gap (4) between them, a sliding ring carrier (5) arranged at the rotating mechanical sliding ring (2), at least one driver element (6) arranged between the rotating mechanical sliding ring (2) and the sliding ring carrier (5) and provided for transmitting a torque from the sliding ring carrier (5) to the rotating sliding ring (2), wherein the rotating sliding ring (2) is clearance-fitted into the sliding ring carrier (5), wherein the rotating sliding ring (2) comprises a first recess (20), wherein the sliding ring carrier (5) comprises a second recess (50), and wherein the (Continued)

Figure 1:
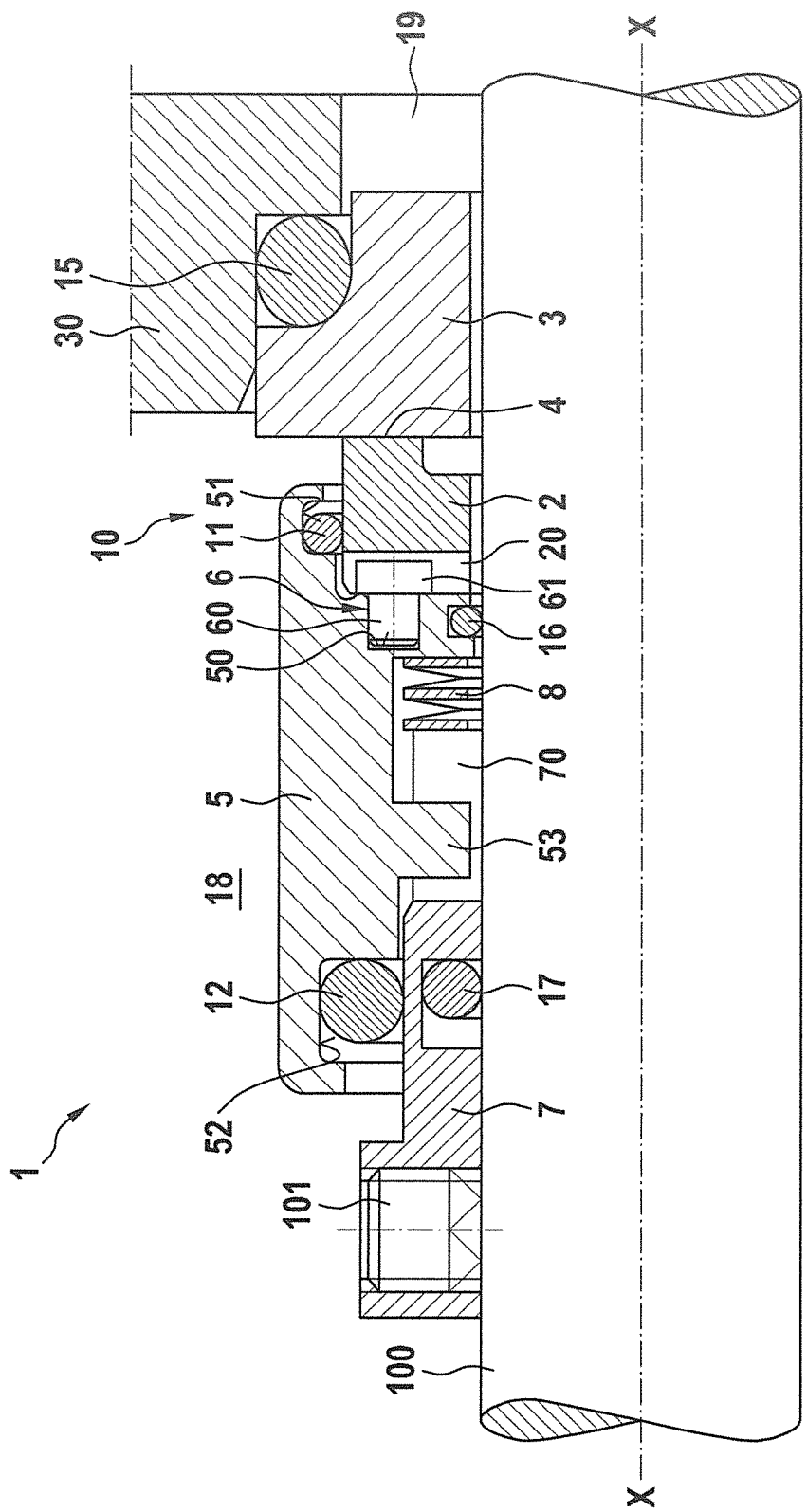

driver element (6) is clearance-fitted into the first recess (20) and is clearance-fitted into the second recess (50).

10 Claims, 4 Drawing Sheets

(56) References Cited

U.S. PATENT DOCUMENTS

| | | | | |
|---|---|---|---|---|
| 5,681,047 | A * | 10/1997 | Klostermann | F16J 15/3468 |
| | | | | 277/400 |
| 6,517,078 | B2 * | 2/2003 | Schruefer | F16J 15/3472 |
| | | | | 277/398 |
| 7,004,473 | B2 * | 2/2006 | Takahashi | F16J 15/3448 |
| | | | | 277/348 |
| 2002/0060429 | A1 | 5/2002 | Schruefer et al. | |
| 2002/0096836 | A1 | 7/2002 | Schulten et al. | |
| 2006/0097456 | A1 | 5/2006 | Giggenbacher et al. | |
| 2008/0093806 | A1 | 4/2008 | Takahashi | |
| 2014/0159316 | A1 * | 6/2014 | Cid | F16J 15/3464 |
| | | | | 277/375 |
| 2016/0178065 | A1 * | 6/2016 | Nakahara | F16J 15/38 |
| | | | | 277/385 |
| 2017/0074404 | A1 * | 3/2017 | Otschik | C04B 41/85 |

* cited by examiner

SLIP RING SEALING ARRANGEMENT AND SLIP RING SEALING KIT

CROSS REFERENCE TO RELATED APPLICATIONS

This application is a U.S. National Phase Application filed under 35 U.S.C. § 371, based on International PCT Patent Application No. PCT/EP2018/071609, filed Aug. 9, 2018, which application claims priority to German Patent Application No. 10 2017 214 132.8, filed on Aug. 14, 2017. The entire contents of these applications is incorporated herein by reference in their entireties.

The invention relates to a mechanical seal arrangement as well as a mechanical seal assembly kit, which especially enables smooth replacement of sliding rings and/or secondary seals.

Mechanical seal arrangements having various configurations are known from prior art. Mechanical seal arrangements comprise a mechanical seal including a rotating sliding ring and a stationary sliding ring, defining a sealing gap between them. Mechanical seal arrangements typically seal a product side from an atmosphere side at a shaft or the like. In this case, torque transmission from the rotating shaft to the rotating sliding ring by means of a rotating sliding ring carrier may occur. Connection between the sliding ring carrier and the rotating sliding ring is established, for example, by means of cylindrical pins, which are arranged in the sliding ring carrier and the rotating sliding ring by means of a press fit.

Such a mechanical seal arrangement is known for example from DE 102015211223 B3. However, this press fit connection tends to introduce unwanted stresses into the rotating sliding ring, which may lead to unevenness at the rotating sliding ring surface facing the stationary mechanical seal. It is also known that sliding ring carriers are thermally shrunk onto the rotating sealing ring. In this process, the sliding ring carrier is heated and expands so that the rotating sliding ring can be attached to a radial inner side of the sliding ring carrier and a rotationally fixed connection between the sliding ring carrier and the rotating sliding ring is created during the cooling process of the sliding ring carrier. This may also result in undesirable stresses onto the sliding ring, which may lead to a high reject rate during production or may reduce a service life of the mechanical seal due to undesirable stresses in the rotating sliding ring.

Therefore, the object of the present invention is to provide a mechanical seal arrangement having long service life while simultaneously a simple design and a simple, inexpensive manufacturing process is provided, and, which especially can avoid stresses introduced into the sliding ring. Furthermore, it is the object of the present invention to provide a mechanical seal assembly kit in which a standardized sliding ring carrier having the most diverse rotating sliding rings and different secondary seal elements may be used.

This object will be accomplished by a mechanical seal arrangement having the features of claim 1 or a mechanical seal assembly kit having the features of claim 10.

The subclaims show preferred further developments of the invention.

The mechanical seal arrangement according to the invention having the features of claim 1 has the advantage that mechanical seal arrangements can be provided especially cost-effectively for various applications. The design of the mechanical seal arrangement is such that a modular kit system can be realized, wherein especially the sliding rings and/or secondary seals of the mechanical seal arrangement may be exchanged according to the most diverse applications. This results in very large cost savings during production of the mechanical seal arrangement. According to the invention, this will be achieved in that the mechanical seal arrangement comprises a mechanical seal including rotating and stationary sliding rings, which define a sealing gap between them. Furthermore, a sliding ring carrier is provided, which is arranged adjacent to the rotating sliding ring, wherein the rotating sliding ring is clearance-fitted into the sliding ring carrier. Furthermore, at least one driver element is provided, which is arranged between the rotating sliding ring and the sliding ring carrier and is adapted to transmit torque from the sliding ring carrier to the rotating sealing ring. The rotating sliding ring has a first recess and the sliding ring carrier has a second recess. The driver element is clearance-fitted into the first recess in the rotating sliding ring and also is clearance-fitted into the second recess in the sliding ring carrier. Thus, torque transmission from the sliding ring carrier to the rotating sliding ring will be prevented to occur, e.g. as in the state of the art, by means of pins having press fits or shrink-fitted connections, which could lead to introduction of undesirable stresses or damage into the rotating sliding ring. As a result, flatness of the sliding surface of the rotating sliding ring cannot be disadvantageously affected, wherein especially the service life of the mechanical seal would be reduced. According to the invention, the loosely inserted rotating sliding ring allows quick and easy assembly and replacement of the rotating sliding ring. Clearance between the driver element and the sliding ring carrier as well as the clearance between the driver groove and the rotating sliding ring is selected to be very small, in particular having a maximum of 1 mm, so that when actuating the mechanical seal assembly only a short clearance path is required to be bridged. Thus, an actuating shock due to the clearance can be avoided.

It is especially preferred for the driver element to be designed such that it has a cylindrical base body and a square, in particular quadratic, contact region. Both the cylindrical base body and the square contact region are each arranged leaving a small clearance in the sliding ring carrier and the rotating sliding ring respectively. Preferably, the square contact region is arranged in a recess in the rotating sliding ring, which is designed to match the shape of the driver element. This allows a large contact surface to be achieved between the square contact region of the driver element and the rotating seal face.

According to another preferred embodiment of the invention, the sliding ring carrier comprises a first annular groove and a second annular groove. A first secondary seal is arranged in the first annular groove and a second secondary seal is arranged in the second annular groove. The first and second secondary seals are an O-ring having a circular cross-section or alternatively an elastic form ring having a cross-section corresponding to the cross-section of the first and second annular groove. Thus, for sterile applications, for example, a form ring can be used in each of the first and second ring grooves, what can meet the sterile requirements of the food industry, for example, when using the mechanical seal arrangement in a pump. By using the form rings in the first and second ring groove, especially regions can be avoided in the two ring grooves, which are not filled with material of the secondary seal element. For other applications, less expensive O-rings may be used, wherein such regions may be present, which are not filled with the material of the O-rings, as there are no sterile requirements to be met. Thus, by replacing the secondary seals in the sliding ring carrier, fast and cost-effective adaptation of the mechanical seal arrangement to different applications may be achieved.

Further preferably, the mechanical seal arrangement comprises a sleeve on which the sliding ring carrier is arranged. The sleeve comprises a groove and the sliding ring carrier comprises a torque introduction region. The torque introduction region is integrally formed at the sliding ring carrier and projects into the groove of the sleeve. This allows for the torque to be transmitted from the sleeve to the sliding ring carrier. The sleeve is preferably arranged directly on a rotating component, in particular a shaft, and is fixed onto the shaft.

Further preferably, the first recess in the rotating sliding ring, in which the driver element is partially arranged, is a continuous first radial slot arranged in the radial direction to the center axis of the rotating sliding ring. The radial slot may cost-effectively be provided in the rotating sliding ring.

Further preferably, the groove in the sleeve is a second radial slot, which is continuous in a radial direction to the center axis of the sleeve. This second radial slot may also be provided particularly easily and cost-effectively, preferably at a free end of the sleeve.

According to another preferred embodiment of the invention, the second recess in the sliding ring carrier for receiving the cylindrical part of the driver element is a cylindrical bore having a slightly larger diameter than a diameter of the cylindrical base body of the driver element. In this way, clearance of the driver element in the second recess of the sliding ring carrier can be ensured.

Further preferably, the mechanical seal arrangement furthermore comprises a spring element, which is arranged between the sliding ring carrier and the rotating sliding ring. The spring element preferably is a spiral spring.

As the rotating sliding ring carrier is loosely arranged in the sliding ring carrier, i.e. having some clearance, it is also possible for the rotating sliding ring carrier to have a diamond-coated slide surface, as no stresses will be introduced by retaining the rotating sliding ring in the sliding ring carrier.

Preferably, the first annular groove of the sliding ring carrier is arranged in the radial direction above the rotating sliding ring, so that the rotating sliding ring will be fixed slightly by the first secondary sealing element, which is arranged in the first annular groove.

Moreover, the present invention relates to a mechanical seal assembly kit comprising a mechanical seal arrangement according to the invention having a rotating sliding ring, selected from the group comprising a carbon ring, a ceramic ring or a diamond-coated sliding ring and/or having a first and second secondary seal for sealing against the sliding ring carrier selected from the group comprising O-rings or elastic form rings having a cross-section corresponding to the first or second recess in the sliding ring carrier.

The mechanical seal arrangement according to the invention is particularly preferred for use in pumps in food applications, for example for conveying beverages, or pharmaceutical applications for medical devices where sterile design of the mechanical seal is required. Furthermore, according to the invention, media including fibrous components, for example in the pulp industry, can be sealed particularly well by the mechanical seal arrangement according to the invention. Due to the modular kit system, the mechanical seal arrangement can be customized for the respective application, resulting in a wide variety of uses for the mechanical seal arrangement.

Figure 2:
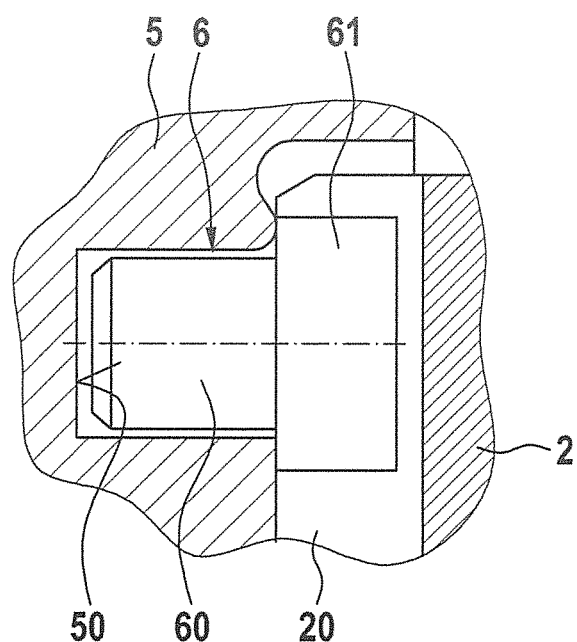
Figure 3:
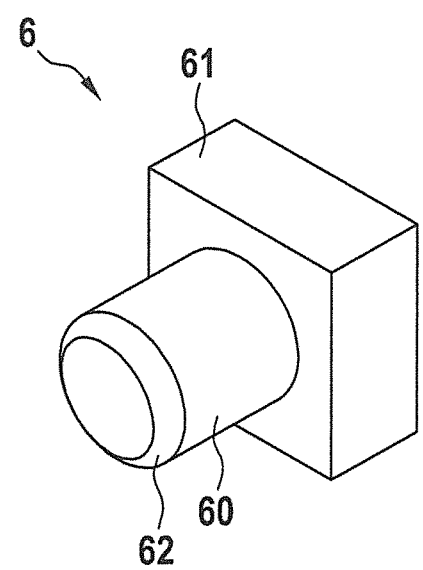
Figure 4:
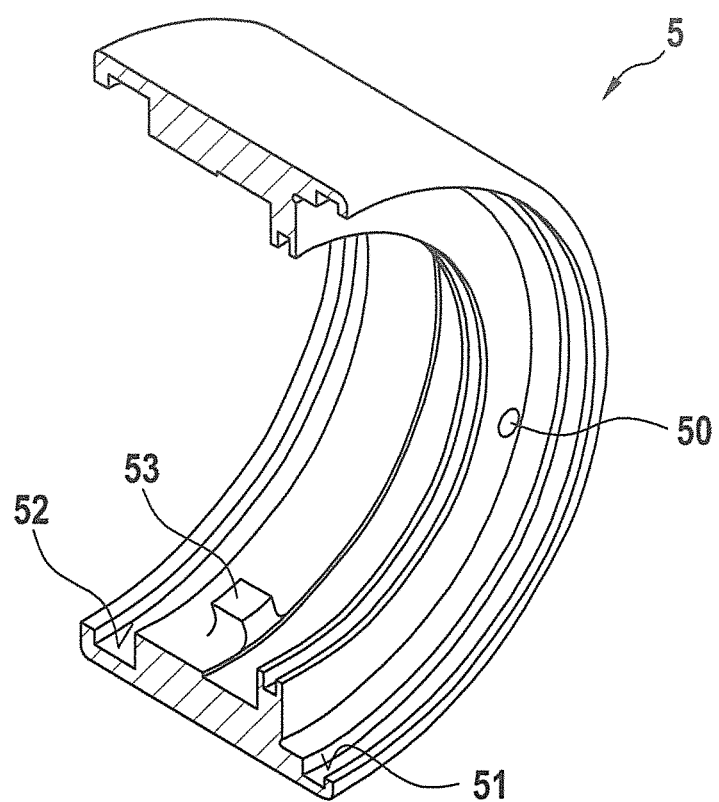
Figure 5:
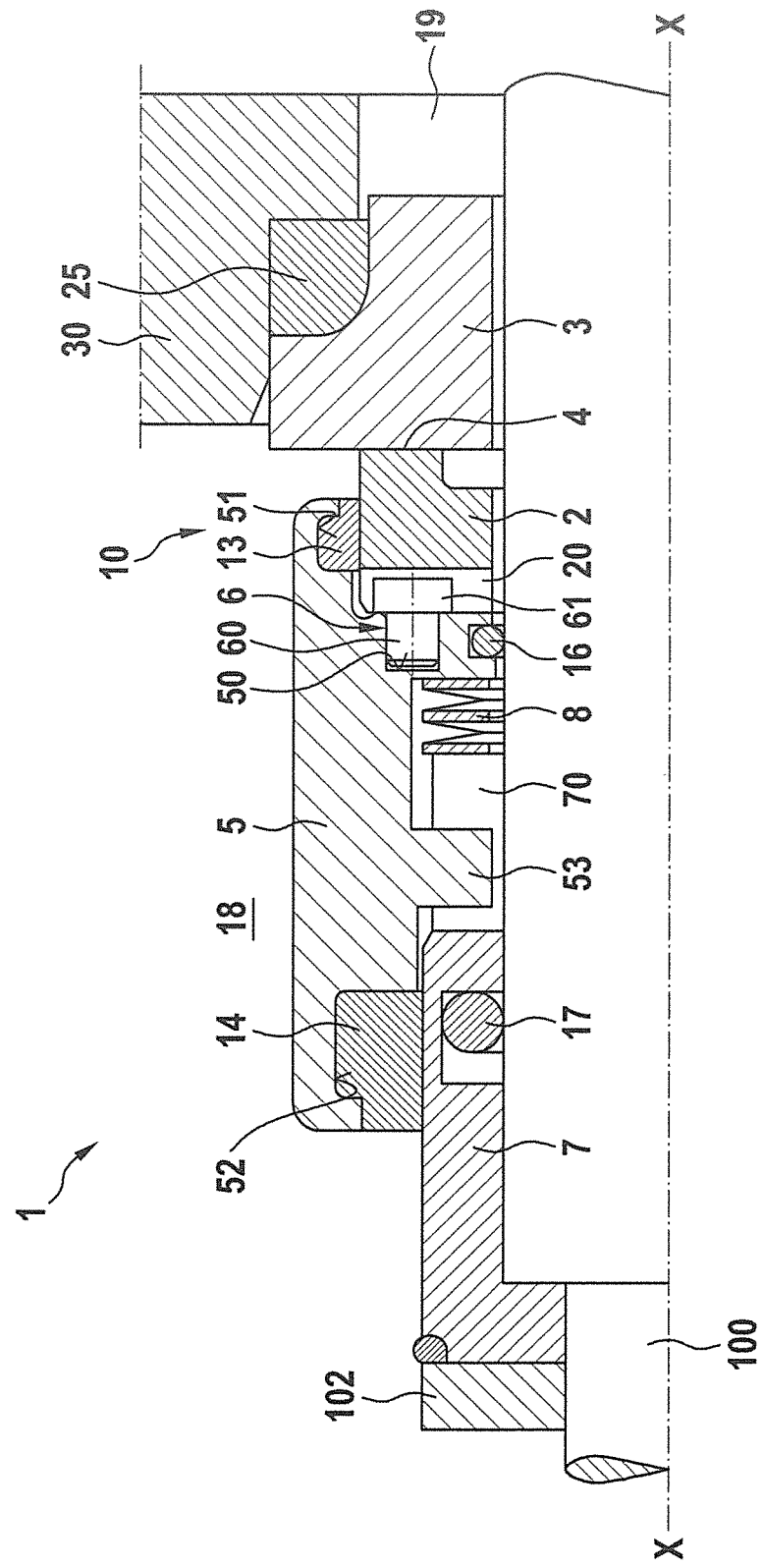

In the following, preferred example embodiments of the invention will be described in detail, while reference will be made to the accompanying drawing, wherein:

FIG. 1 is a schematic sectional view of a mechanical seal arrangement according to a first embodiment of the invention, FIG. 2 is a schematic, enlarged sectional view of a driver element of FIG. 1, FIG. 3 is a perspective view of the driver element of FIG. 2, FIG. 4 is a perspective cut-out view of a sliding ring carrier of FIG. 1, and FIG. 5 is a schematic sectional view of a mechanical seal arrangement according to a second embodiment of the invention.

In the following, a mechanical seal arrangement 1 according to a first preferred example embodiment of the invention will be described in detail below, while making reference to FIGS. 1 through 4.

As can be seen from FIG. 1, the mechanical seal assembly 1 comprises a mechanical seal 10 having a rotating mechanical sliding ring 2 and a stationary mechanical sliding ring 3. The rotating mechanical sliding ring 2 and the stationary mechanical sliding ring 3 define a sealing gap 4 between them.

The rotating mechanical sliding ring 2 comprises a first recess 20, which is formed as a radially continuous slot in this embodiment. The first recess 20 extends in a radial direction perpendicular to an axial direction X-X of the mechanical seal arrangement at a rear side of the rotating sliding ring, which rear side is opposite to the sliding surface of the rotating sliding ring 2, directed towards the stationary sliding ring 3.

The mechanical seal arrangement 1 furthermore comprises a sliding ring carrier 5, which is made of a metallic material. The sliding ring carrier 5 is also shown in detail in FIG. 4. The sliding ring carrier 5 comprises a first annular groove 51 and a second annular groove 52. Furthermore, the sliding ring carrier 5 comprises a second recess 50. In this embodiment, the second recess 50 is a bore.

Furthermore, a driver element 6 is provided, which is shown in detail in FIGS. 2 and 3. The driver element 6 comprises a cylindrical base body 60 and a square contact region 61. At the free end of the cylindrical base body 60, a chamfer 62 is provided. In the assembled state, the cylindrical base body 60 is positioned in the second recess 50 of the sliding ring carrier 5 and the square contact region 61 is in the first recess 20 in the rotating sliding ring 2. The driver element 6 has clearance in all directions, i.e. axially, radially and circumferentially, in both the first recess 20 and the second recess 50. A torque can be transmitted from the sliding ring carrier 5 to the rotating sliding ring 2 via the driver element 6.

As further shown in FIG. 1, the first annular groove 51 in the sliding ring carrier 5 is provided radially outside the rotating sliding ring 2 directly above the rotating sliding ring 2. In the first annular groove 51, a first secondary seal is arranged, which is a first O-ring 11 in this example embodiment.

Furthermore, the mechanical seal assembly 1 comprises a spring element 8, which is arranged between a sleeve 7 and the sliding ring carrier 5. The sleeve 7 is firmly connected to a rotating component, in this example embodiment a shaft 100. The spring element 8 biases the rotating sliding ring 2 in the axial X-X direction by means of the sliding ring carrier 5 to the stationary sliding ring 3.

In addition, a torque transmission region 53, which projects into a groove 70 in the sleeve 7, is integrally provided at the sliding ring carrier 5, as shown in FIG. 1. The groove 70 is provided at a free end of the sleeve 7, which free end facing towards the rotating sliding ring 2, and is continuously formed in the radial direction. The sleeve 7 is firmly fixed to the shaft 100, for example by a clamping connection or by a setscrew 101, as shown in FIG. 1.

A second secondary seal in the form of a second O-ring 12 is arranged in the second annular groove 52 of the sliding ring carrier 50, sealing the sliding ring carrier 5 against the sleeve 7.

The stationary mechanical sliding ring 3 is arranged on a housing 30 and is sealed by a third O-ring 15.

Furthermore, the mechanical seal assembly 1 comprises a fourth O-ring 16 at the sliding ring carrier 5, which seals against the shaft 100, and a fifth O-ring 17, which is arranged at the sleeve 7 and also seals against the shaft 100.

The mechanical seal arrangement 1 seals a product side 18 against an atmosphere side 19. In this example embodiment, the mechanical seal arrangement 1 is located at a shaft 100, which drives a pump. Herein, no sterile application is provided, as regions are provided in the first annular groove 51 and the second annular groove 52 which are not filled with the first O-ring or the second O-ring 12, As the first O-ring 11 is arranged radially above the rotating sliding ring 2, the rotating sliding ring 2, which is clearance-fitted into the sliding ring carrier 5, will be fixed slightly. As the driver element 6 also has a clearance both in relation to the cylindrical base body 60 and the square contact region 61, no stresses are transferred to the rotating sliding ring 2 due to shrinkage or press fits between the driver element and the rotating sliding ring 2. As a result, the rotating mechanical seal 2 may easily be replaced or the mechanical seal assembly may be adapted to the rotating mechanical seal 2 without great cost by simply replacing the rotating mechanical seal 2 comprising different materials. Furthermore, the first O-ring 11 and the second O-ring 12 may also be easily replaced by sterile, elastic form seals. This provides for a mechanical seal modular kit system in which the secondary seals at the sliding ring carrier and the rotating mechanical seal 2 may easily be replaced depending on the application, as they are only inserted in the sliding ring carrier 5.

FIG. 5 shows a mechanical seal arrangement according to a second embodiment of the invention. In the second example embodiment, in contrast to the first example embodiment, the first and second secondary sealing elements at the sealing ring carrier 5 are not configured as O-rings, but as a first elastic form ring 13 and a second elastic form ring 14. The elastic form ring 13 is arranged in the first annular groove 51 in the sealing ring carrier and the second elastic form ring 14 is arranged in the second annular groove 52 in the sealing ring carrier. By using the elastic form rings, all cross-sectional regions of the first and second annular grooves 51, 52 can be filled with an elastic material of the form rings. A third elastic form ring 25 is also arranged at the stationary sealing ring 3. The sleeve 7 is arranged at a shaft shoulder and can be clamped in place or fixed with an additional ring 102 and a squeezed O-ring 103. This qualifies the mechanical seal arrangement 1 of the second embodiment to be suitable for sterile applications, for example in the pharmaceutical industry or in the food industry.

Thus, according to the invention, a cost-effective mechanical seal kit system may be provided, which has a common sliding ring carrier 5, a common sleeve 7, a common spring element 8 and a common driver element 9. As the driver element 6 and the rotating mechanical seal 2 are solely inserted into the sealing ring carrier 5, a particularly simple and cost-effective assembly may be provided without the risk of damaging the rotating sliding ring when being assembled, as possible, for example, when using a state-of-the-art thermal shrinking process for fixing the rotating sealing ring.

LIST OF REFERENCE NUMBERS

1 Mechanical seal arrangement
2 Rotating sealing ring
3 Stationary sealing ring
4 Sealing gap
5 Sliding ring carrier
6 Driver element
7 Sleeve
8 Spring element
10 Mechanical seal
11 First O-ring
12 Second O-ring
13 First elastic form ring
14 Second elastic form ring
15 Third O-ring
16 Fourth O-ring
17 Fifth O-ring
18 Product side
19 Atmosphere side
20 First recess in the rotating seal ring
25 Third elastic form ring
30 Housing
50 Second recess in the sealing ring carrier
51 First annular groove
52 Second annular groove
53 Torque transmission region
60 Cylindrical body
61 Square contact region
62 Chamfer
70 Groove
100 Shaft
101 Setscrew
102 Additional ring
103 Squeezed O-ring
X-X Axial direction

The invention claimed is:

1. A mechanical seal arrangement comprising:
a mechanical seal including a rotating sliding ring and a stationary sliding ring defining a sealing gap therebetween, a sliding ring carrier, which is arranged on the rotating sliding ring,
at least one driver element, which is arranged between the rotating sliding ring and the sliding ring carrier and is adapted to transmit a torque from the sliding ring carrier to the rotating sliding ring, wherein the rotating sliding ring is clearance-fitted into the sliding ring carrier, wherein the rotating sliding ring comprises a first recess, wherein the sliding ring carrier comprises a second recess, and wherein the driver element is clearance-fitted into the first recess and clearance-fitted into the second recess.

2. The mechanical seal arrangement according to claim 1, wherein the driver element comprises a cylindrical base body and a square contact region.

3. The mechanical seal arrangement according to claim 1, wherein the sliding ring carrier comprises a first annular groove and a second annular groove, wherein a first secondary seal is arranged in the first annular groove and a second secondary seal is arranged in the second annular groove, wherein each of said first and second secondary seal is an O-ring having circular or elliptical cross-section, or wherein each of said first and second secondary seal is an elastic shaped ring having a cross-section corresponding to a cross-section of said first and second annular groove.

4. The mechanical seal arrangement according to claim 1, further comprising a sleeve, the sliding ring carrier being arranged on the sleeve, wherein the sleeve comprises a groove and is connected to the sliding ring carrier by means of a torque transmitting portion, wherein the torque transmission region is integrally formed with the sliding ring carrier and projects into the groove of the sleeve to enable torque transmission from the sleeve to the sliding ring carrier.

5. The mechanical seal arrangement according to claim 1, wherein the first recess in the rotating mechanical seal is a first radial slot, which is continuous in the radial direction with respect to the axial direction (X-X).

6. The mechanical seal arrangement according to claim 1, wherein the groove in the sleeve is a second radial slot, which is continuous in the radial direction with respect to the axial direction (X-X).

7. The mechanical seal arrangement according to claim 1, wherein the second recess of the sliding ring carrier is a cylindrical bore having a diameter such that the cylindrical base body of the driver element is clearance-fitted into the cylindrical bore.

8. The mechanical seal arrangement according to claim 1, further comprising a spring element arranged between the sliding ring carrier and the rotating mechanical seal.

9. The mechanical seal arrangement according to claim 1, wherein said rotating sliding ring having has a diamond-coated sliding surface.

10. A mechanical seal kit comprising a mechanical seal arrangement according to claim 1, wherein the rotating sliding ring is selected from the group comprising a carbon ring or a ceramic ring or a sliding ring having a diamond-coated sliding surface and/or wherein the first and/or second secondary seal for sealing against the sliding ring carrier is selected from the group comprising O-rings having circular or elliptical cross-sections or elastic form rings having a cross-section corresponding to the cross-section of the first and second annular groove in the sliding ring carrier.

* * * * *